United States Patent [19]
Schwarz

[11] Patent Number: 5,722,883
[45] Date of Patent: Mar. 3, 1998

[54] OUTFLOW NOZZLE FOR A VEHICLE

[75] Inventor: Stefan Schwarz, Rochester Hills, Mich.

[73] Assignee: Valeo Klimasysteme GmbH, Rodach, Germany

[21] Appl. No.: 646,289

[22] PCT Filed: Sep. 18, 1995

[86] PCT No.: PCT/EP95/03673

§ 371 Date: Jul. 29, 1996

§ 102(e) Date: Jul. 29, 1996

[87] PCT Pub. No.: WO96/09182

PCT Pub. Date: Mar. 28, 1996

[30] Foreign Application Priority Data

Sep. 23, 1994 [EP] European Pat. Off. ............ 94115041

[51] Int. Cl.⁶ .................................................. B60H 1/34
[52] U.S. Cl. .......................... 454/155; 454/315; 454/319
[58] Field of Search ............................ 454/76, 109, 154, 454/202, 286, 315, 319

[56] References Cited

U.S. PATENT DOCUMENTS

| | | |
|---|---|---|
| 4,653,385 | 3/1987 | Ito et al. |
| 4,665,804 | 5/1987 | Miyasaka ............................ 454/315 |
| 4,669,370 | 6/1987 | Hildebrand et al. ................ 454/155 |
| 5,588,910 | 12/1996 | Hutter et al. .................... 454/155 X |

FOREIGN PATENT DOCUMENTS

| | | | |
|---|---|---|---|
| 195 344 | 9/1986 | European Pat. Off. . | |
| 210 548 | 2/1987 | European Pat. Off. . | |
| 29 10 125 | 9/1980 | Germany | 454/315 |
| 35 33 464 | 3/1986 | Germany . | |
| 60-244619 | 12/1985 | Japan | 454/155 |

*Primary Examiner*—Harold Joyce
*Attorney, Agent, or Firm*—Morgan & Finnegan

[57] ABSTRACT

In order to be able to obtain in spite of individual adjustment possibilities for defined directions of air flow a uniform front design on the interior side that is not disturbed by different positions of deflecting fins or adjusting elements, deflecting fins (L1 to L6) behind a flow direction-neutral front baffle (F) can be driven into a corresponding dwelling position by a brief adjusting pivot motion with subsequent resetting of the front baffle (F).

14 Claims, 6 Drawing Sheets

OUTFLOW NOZZLE FOR A VEHICLE

FIELD OF THE INVENTION

The invention relates to an outflow nozzle of a heating and/or air-conditioning system, in particular for a motor vehicle, according to claim 1.

BACKGROUND OF THE INVENTION

An outflow nozzle for a heating and/or air-conditioning system for the interior space of motor vehicles is known from EP-A3-0 210 548. In connection with said system, a separate control button for adjusting the horizontal and vertical direction of flow of the stream of air passing through the outflow nozzle is adjustably arranged in the center of the front side.

SUMMARY OF THE INVENTION

According to the problem of the present invention, the objective is to make it possible, on the one hand, to deflect in a defined way the stream of air exiting from the outflow nozzle, with simple and clear controllability and, on the other, to permit design possibilities for the front of the outflow nozzle that are independent of any particular arrangement of control elements, combined with simple manufacture and installation as well as a compact design. Advantageous further developments of the invention are the subject matter of the subsidiary claims.

By jointly using in accordance with the invention the quickly pivotable front baffle itself as a control element for the deflecting fins to be set to a certain position of swivel behind the front baffle, it is possible to dispense with special front-side control elements and to consequently design the front baffle on purely design considerations without its own flow setting. Usefully, for adjusting both horizontal and vertical flow characteristics of the stream of air, provision is made for a first array of deflecting fins and a second array of deflecting fins, whereby the swivel axes of the deflecting fins of the one array of deflecting fins are substantially perpendicular to the swivel axis of the other array of deflecting fins. The adjustment of the two arrays of deflecting fins by the adjusting element of the front baffle itself can be accomplished in this case in a particularly simple way by associating a first plane of swivel of the front baffle with one array of deflecting fins, and a second plane of swivel of the front baffle with the other array of deflecting fins, the latter plane usefully being perpendicular to the former, whereby in the way of a gimbal mounting of the front baffle relative to the housing of the outflow nozzle, the front baffle is concentrically swinging in the first plane swivel around an axle supported in the nozzle housing, and in the second plane of swivel, the axle itself, is capable of swinging with the front baffle relative to the nozzle housing.

BRIEF DESCRIPTION OF THE DRAWINGS

The invention as well as further advantageous developments of the invention are explained in greater detail by reference to the exemplified embodiments schematically shown in the drawing, in which:

FIG. 1 shows in a perspective, exploded view an outflow nozzle having on the back side a nozzle housing DG, and on the front side a front baffle F in a front baffle casing FG. In the front baffle casing FG, the horizontal fins L1; L2 are pivot-mounted in a first array of deflecting fins, and the vertical fins L3 to L6 are pivot-mounted in a second array of deflecting fins, the latter fins being arranged behind the first array of fins, said deflecting fins being capable of swinging relative to said front baffle casing FG. For clearly showing the pivot-mount, the axes of swivel of the first deflecting fins L1 are denoted by the reference symbols S1, and the ones of the second deflecting fin by the reference symbol S2. Said axles are supportable in the pivot receptacles SA1 and SA2, respectively, of the front baffle casing FG. In a similar way, the vertical fins L3 to L6 are fitted with end-side pivots, which are supportable in corresponding pivot receptacles of the top and bottom walls of the front baffle casing FG.

The front baffle F or front baffle casing FG is supported in the nozzle housing DG in the way of a cross joint or gimbal mounting in the sense of two planes of swivel, the latter preferably being aligned vertically against each other, whereby each said planes of swivel is associated with one array of deflecting fins. For this purpose, according to one development of the invention, the entire front baffle casing FG is capable of pivoting about a horizontal front baffle axle A, on the one hand, in that the end-side pivots D1; D1 of the front screen axle A engage the bearing receptacles DA of the front baffle casing FG, and, on the other hand, about a vertical axis extending perpendicular to the horizontal one, in that a center shaft stub WS of the front baffle axle A is received in a shaft stub receptacle WA of the nozzle housing DG in a direction perpendicular to the axle A.

The horizontal deflecting fins L1; L2 of the first plane or array of deflecting fins are connected via a coupling rod K1 in a way such that all deflecting fins of said plane of deflecting fins are jointly pivoted by said coupling rod K1 about their pivots. The coupling rod couplings KL1 and KL2 in the coupling rod K1 serve for the mutual coupling, said couplings being associated with the corresponding coupling rod axles S3 and S4, respectively, of the first deflecting fin L1 and, respectively, the second deflecting fin L2.

Figure 1:
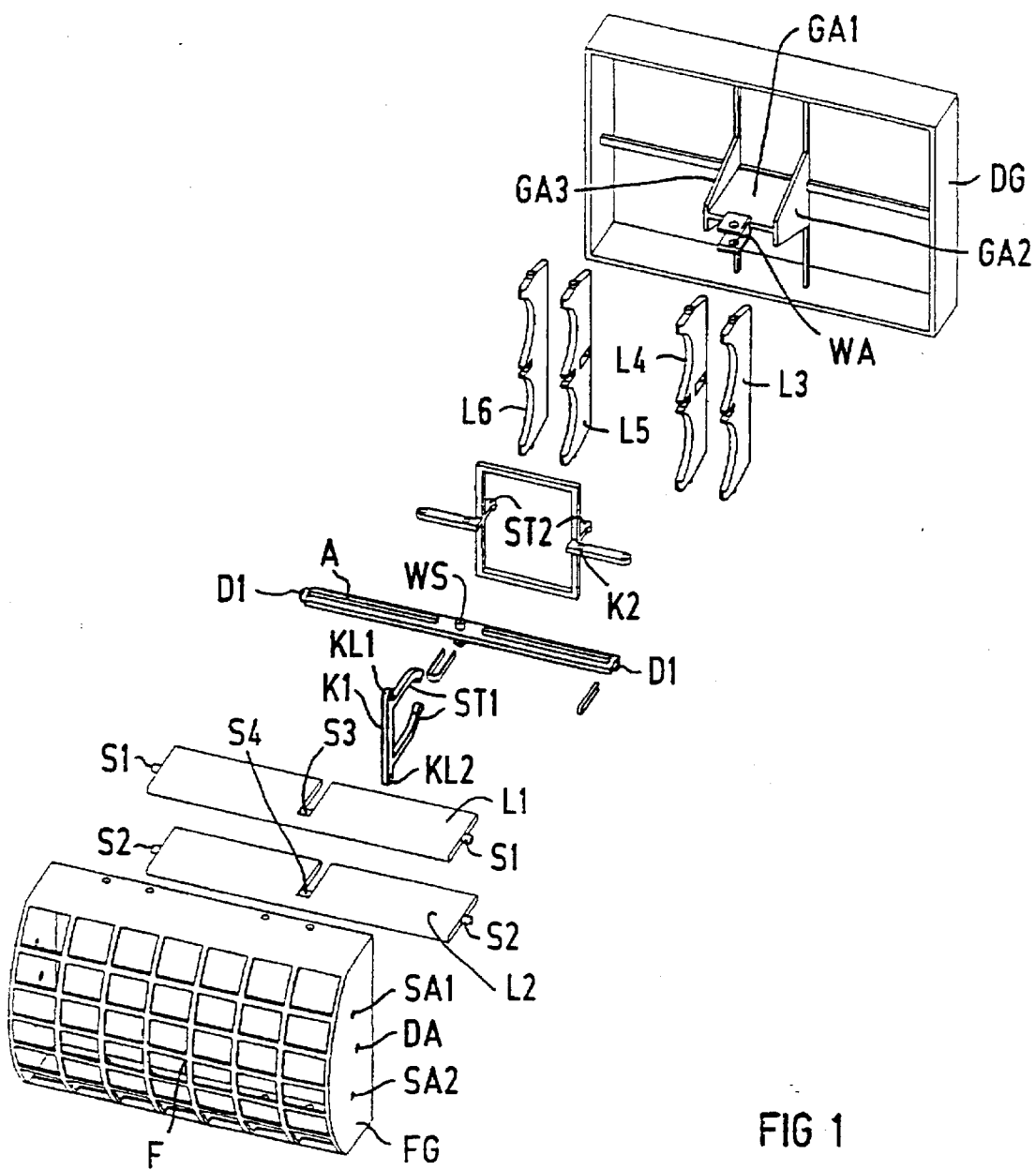
FIG. 1 shows in a perspective, exploded view the essential components of an outflow nozzle according to the invention.
Figure 2:
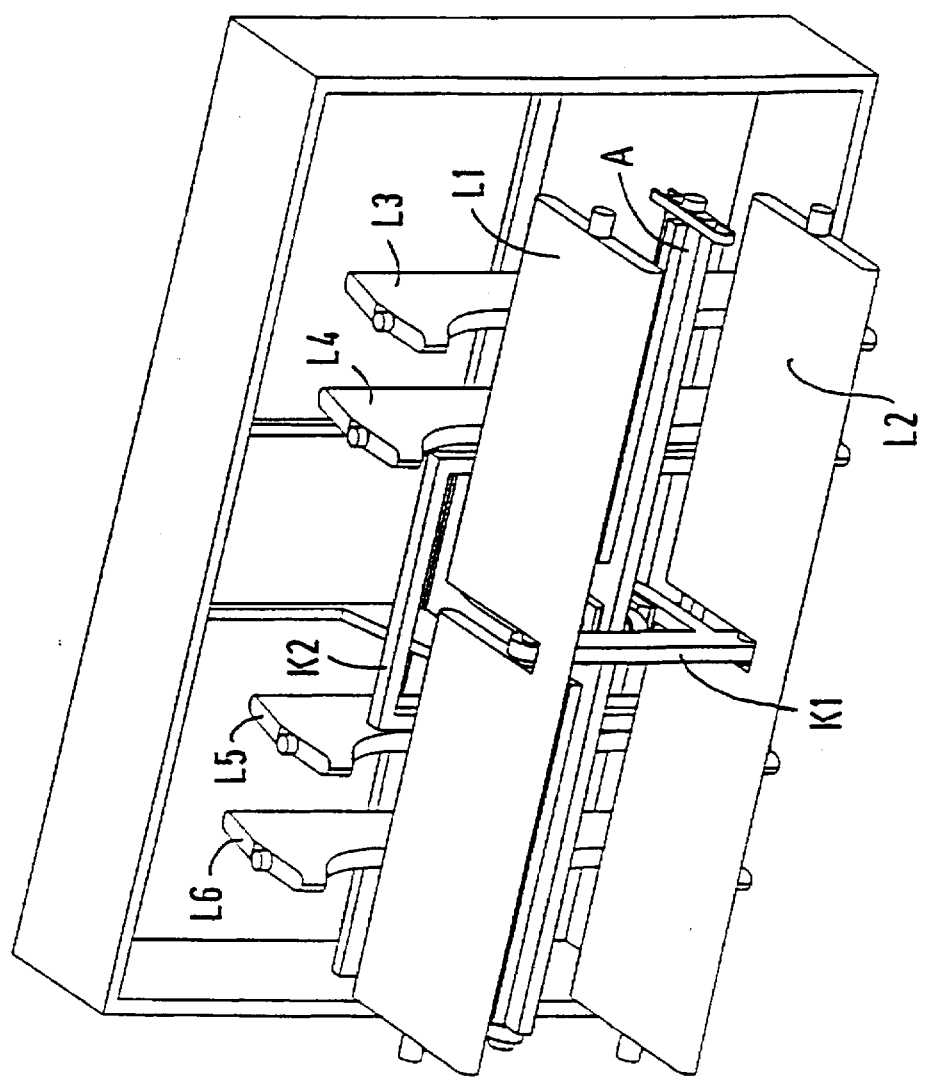
FIG. 2 shows the array according to FIG. 1 after it has been assembled; however, without the front baffle and the front baffle housing.
Figure 3:
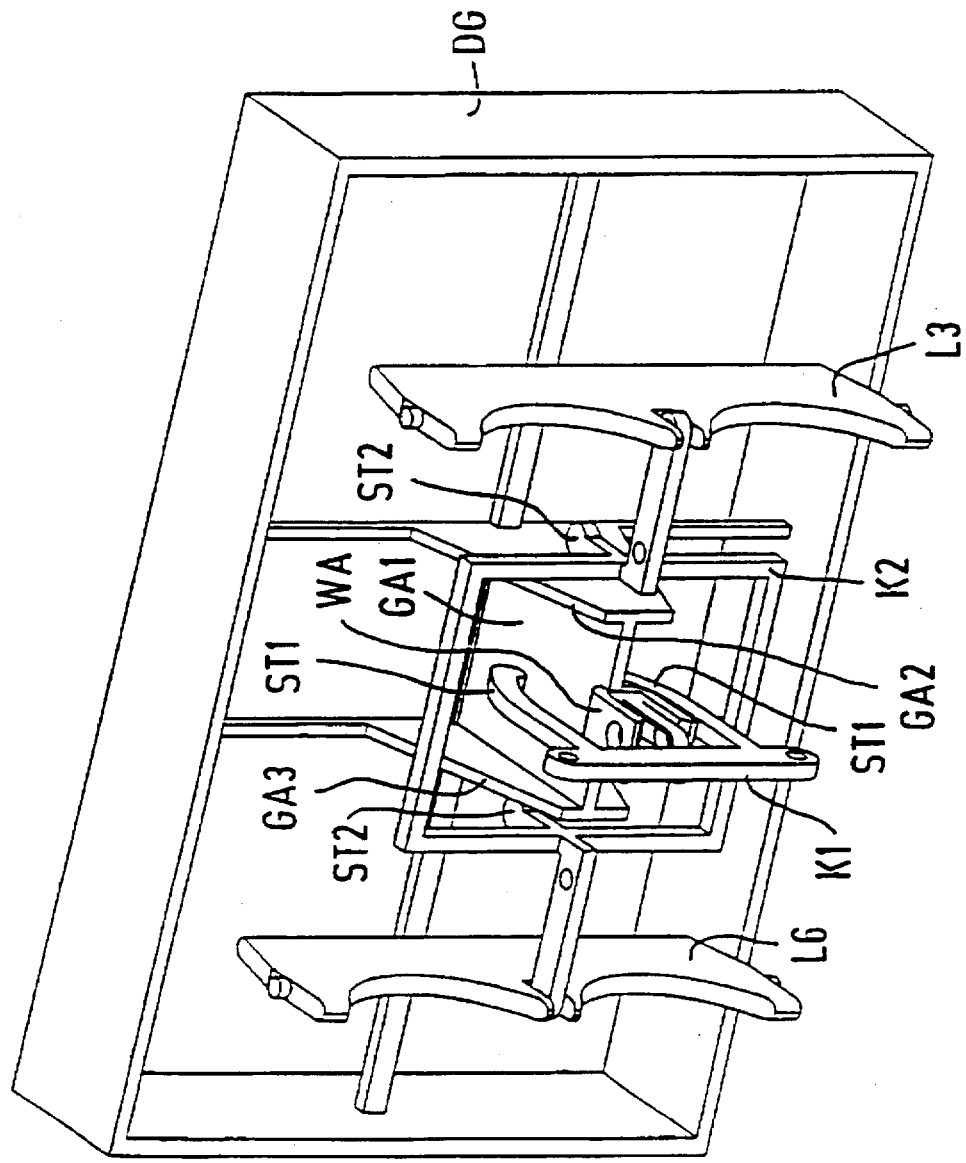
FIG. 3 shows the array according to FIG. 1 partly assembled, with a first array of deflecting fins and a first coupling rod, as well as with a second array of deflecting fins and a second coupling rod.
Figure 4:
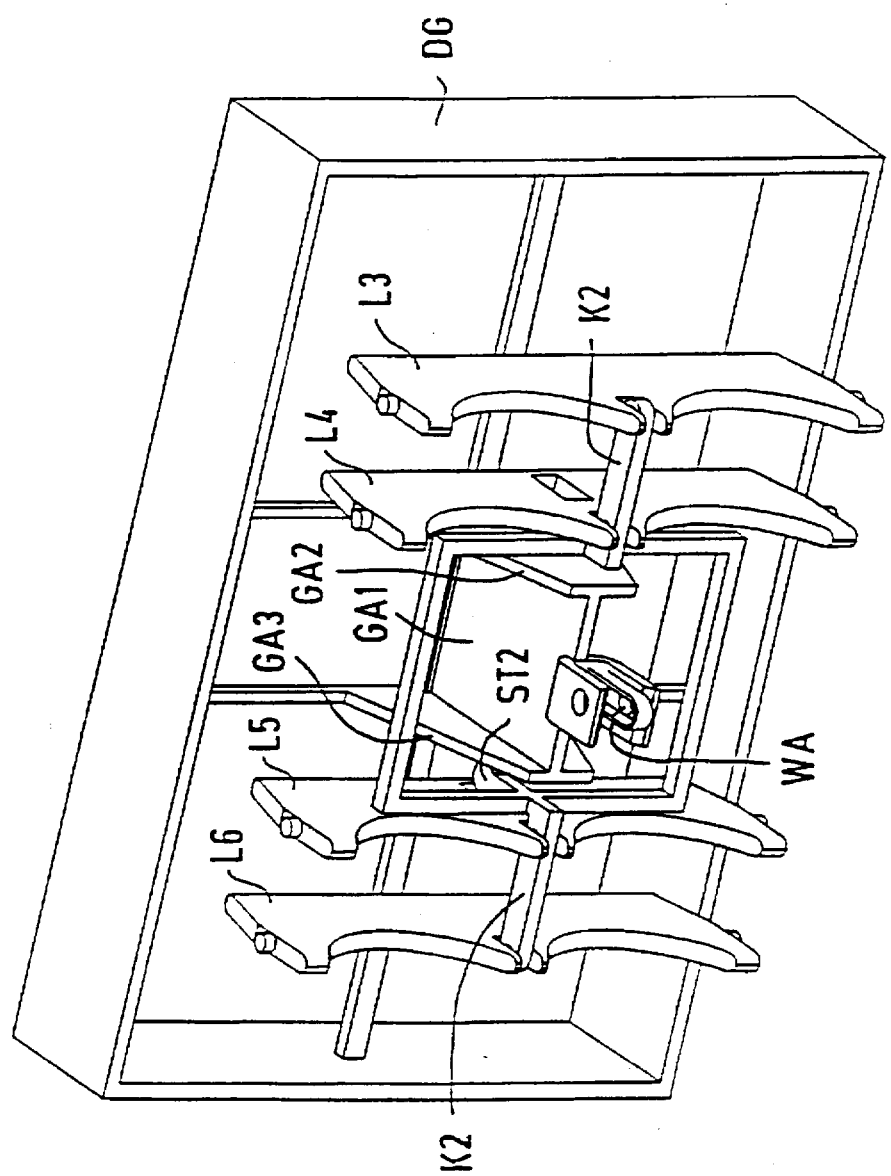
FIG. 4 shows the array according to FIG. 1 partly assembled, with only the second array of deflecting fins.
Figure 6:
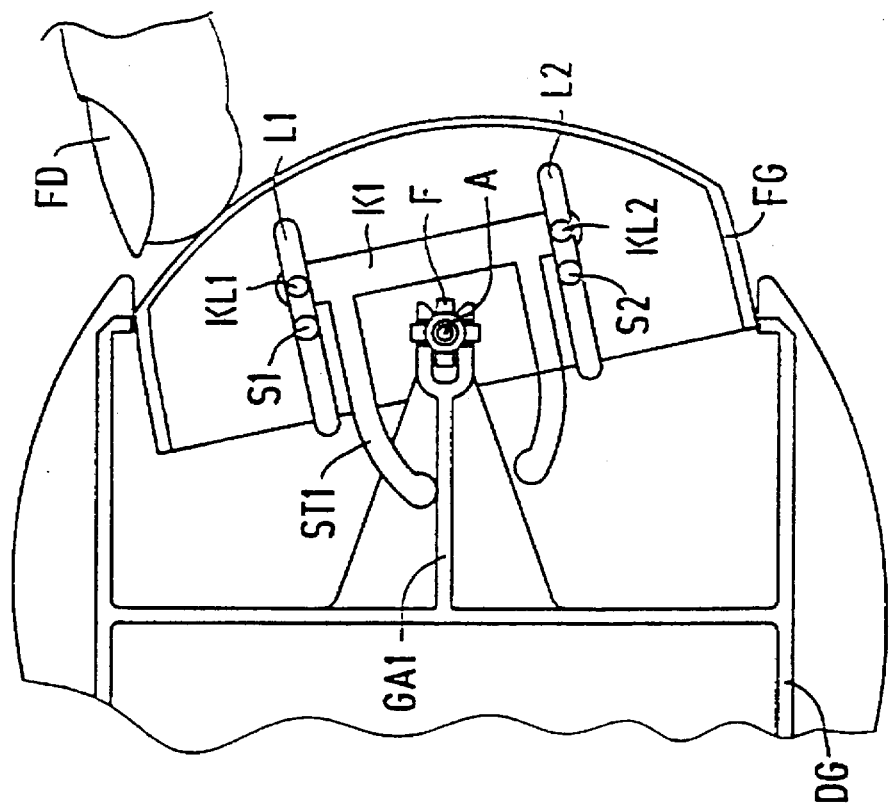
FIGS. 5 to 8 each show in sectional view four adjustments of the horizontal deflecting fins of the first array of deflecting fins.
Figure 5:
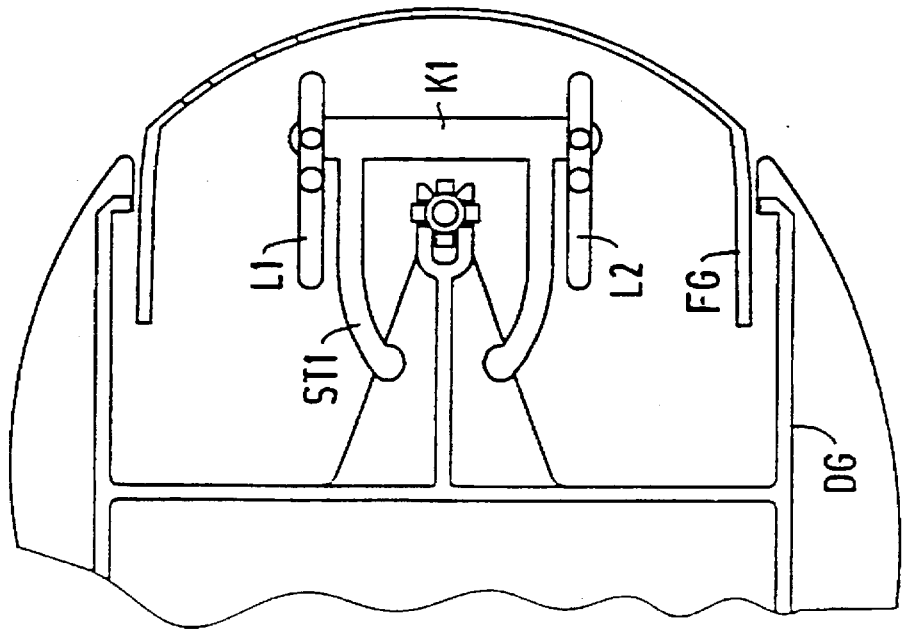
Figure 8:
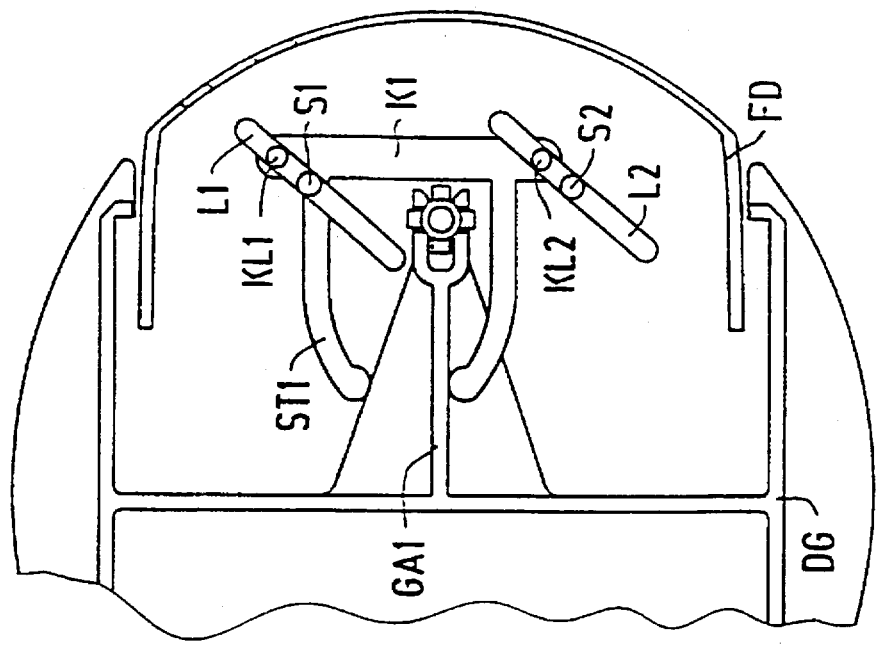
Figure 7:
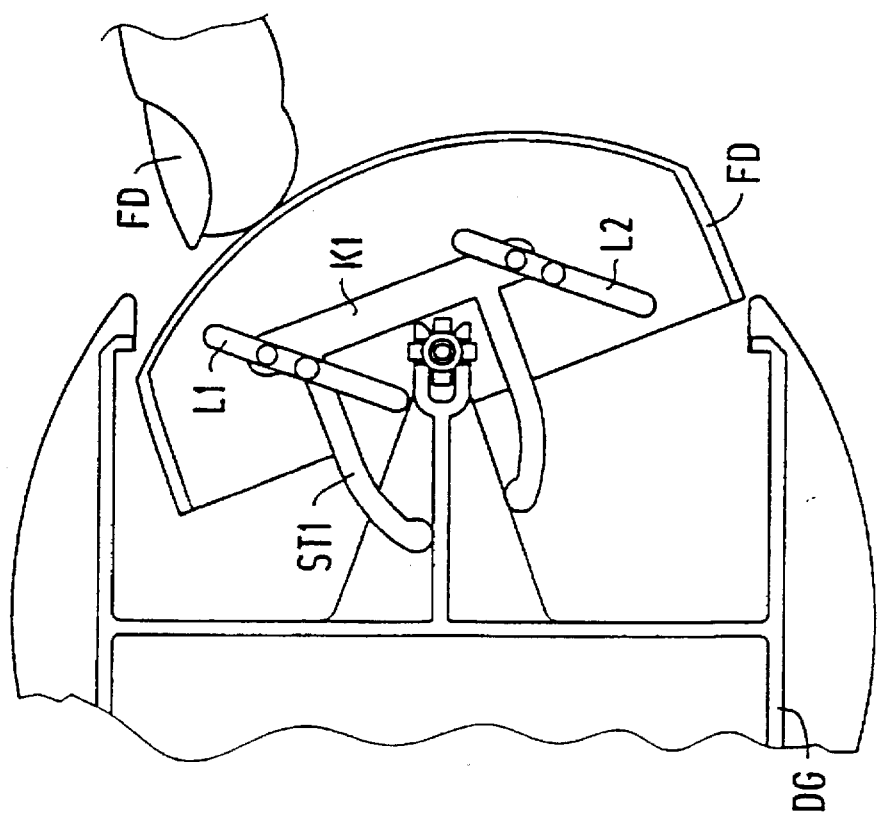

The adjustment of the deflecting fins L1 and L2 of the first array of deflecting fins by briefly pivoting the front baffle F about its front baffle axle A in the one or other direction is explained in greater detail in the following by reference to the sequence of actuation shown in FIGS. 5 to 8:

In FIG. 5, the front baffle F is in its normal operating position; the horizontal deflecting fins L1 and L2 are set in the sense of a horizontal flow characteristic. Now, when in accordance with FIG. 6 the front baffle F is tilted, for example by finger pressure FD about the axle A into the position shown in FIG. 6, the coupling rod K1, after a certain dead travel, comes into contact with a nozzle housing stop GA1 via a projecting tappet ST1 or ST2. When the front baffle F is pivoted further according to FIG. 7, the coupling rod K1 is moved with the aid of the tappet ST1—which rests against the nozzle housing stop GA1—relative to the front baffle F in a way such that the horizontal deflecting fins L1 and L2 are pivoted about their pivots S1 and S2, respectively, in the sense of a slanted upward flow characteristic of the stream of air exiting from the nozzle. Following such brief pivoting of the front baffle F, the latter can pivot back into its optimal normal operating position according to FIG. 5, such pivoting back being caused either by finger pressure in the opposite direction or by a spring device, which has been automatically preloaded previously, whereby the deflecting fins L1 and L2 remain in their adjusted position, for example because of the frictional resistance. With pivoting of the front baffle F in the opposite direction, the deflecting fins L1 and L2 are set downward in a way similar to the one described above, i.e., after a certain dead travel, the lower tappet ST2 of the coupling rod K1 comes to a stop against nozzle housing stop GA and the coupling rod K1 is subsequently moved further in the sense of a slanted downward adjustment of the deflecting fins L1 and L2.

The vertical deflecting fins L3 to L6 of the second array of deflecting fins are advantageously adjusted again through pivoting of the front baffle F or front baffle casing FG, whereby a second pivoting of the axle A itself with the front baffle takes place relative to the nozzle housing DG, in particular relative to the first vertical plane of swivel. For such pivoting, the axle A has in the center a shaft stub WS, which is supported by a shaft stub receptacle WA of the nozzle housing DG with a direction of rotation vertical to the axle A.

The vertical deflecting fin L3 to L6 of the second array of deflecting fins are jointly adjustable by a coupling rod K2 in a way similar to the adjustment of the first array of deflecting fins, whereby said coupling rod is designed in the center, for example in the form of a rectangular frame for gripping around the shaft stub receptacle WA. For adjusting the vertical deflecting fins L3 to L6, the axle A is briefly pivoted in the one or other direction horizontally around the shaft stub WS, whereby upon surmounting a certain dead distance, the tappets ST2 projecting from and shaped by molding on the coupling rod K2 come to a stop against the nozzle housing stops GA2 and GA3, in a way such that with further pivoting of the front baffle F or front baffle casing FG, the deflecting fins of the second array of deflecting fins are carried along and driven into a defined slanted position with the help of the coupling rod K2. When the front baffle F or front baffle casing FG is subsequently pushed back or returned into the normal operating position by spring force, the deflecting fins L3 to L6 remain in their previously assumed slanted position, for example due to frictional resistance.

It is obvious that owing to the outflow nozzle designed according to the invention, a vertical array of deflecting fins and, independently of the latter, a horizontal array of deflecting fins are adjustable in a simple way by merely briefly tapping the front baffle without the necessity of a special control button.

I claim:

1. Outflow nozzle of a heating and/or air-conditioning system, with a flow direction-neutral front baffle capable of pivoting from a normal operating position relative to a nozzle housing receiving said front baffle, and with deflecting fins, the latter being adjustable behind the front baffle relative to the latter and determining the direction of flow, such deflecting fins being adapted for pivoting in one or other direction into a corresponding dwelling position by a brief adjusting swivel motion of the front baffle with subsequent return setting of the front baffle.

2. Outflow nozzle according to claim 1, with a first array of deflecting fins with a first adjustability of the direction of flow, and with a second array of deflecting fins with a second adjustability of the direction of flow, the latter being substantially perpendicular to the first.

3. Outflow nozzle according to claim 2, with a first array of deflecting fins and a second array of deflecting fins arranged one after the other in the direction of flow.

4. Outflow nozzle according to claim 1, with a cross joint-like mounting of the front baffle in the nozzle housing.

5. Outflow nozzle according to claim 4, with a first plane of swivel of the front baffle through concentric swiveling of the front baffle around an axle supported in the nozzle housing, and with a second plane of swivel of the front baffle, the latter in particular being vertical relative to the first one, by correspondingly swinging the axle with the front baffle relative to the nozzle housing.

6. Outflow nozzle according to claim 4, in each case with an association of one plane of swivel with a first array of deflecting fins, and of another plane of swivel with a second array of deflecting fins.

7. Outflow nozzle according to claim 4, with the front baffle pivotable in the front plane of swivel about axially outer pivots of the axle, and with an axle or front baffle pivotable in the second plane of swivel about a center shaft stub in a shaft stub receptacle of the nozzle housing.

8. Outflow nozzle according to claim 1, with deflecting fins in a first and second array of deflecting fins coupled in each case outside of their pivot mount by at least one coupling rod and adjusted during pivoting of the front baffle by stopping of the coupling rod on a housing stop.

9. Outflow nozzle according to claim 2, with a cross joint-like mounting of the front baffle in the nozzle housing.

10. Outflow nozzle according to claim 3, with a cross joint-like mounting of the front baffle in the nozzle housing.

11. Outflow nozzle according to claim 5, in each case with an association of the one plane of swivel with the one array of deflecting fins, and of the other plane of swivel with the other array of deflecting fins.

12. Outflow nozzle according to claim 5, with a front baffle pivotable in the front plane of swivel about axially outer pivots of the axle, and with an axle or front baffle pivotable in the second plane of swivel about a center shaft stub in a shaft stub receptacle of the nozzle housing.

13. Outflow nozzle according to claim 6, with a front baffle pivotable in the front plane of swivel about axially outer pivots of the axle, and with an axle or front baffle pivotable in the second plane of swivel about a center shaft stub in a shaft stub receptacle of the nozzle housing.

14. Outflow nozzle according to claim 1, with deflecting fins in a first and second array of deflecting fins coupled in each case outside of their pivot mount by at least one coupling rod and adjusted during pivoting of the front baffle by stopping of the coupling rod on a housing stop.

* * * * *